United States Patent
Dupont et al.

(10) Patent No.: US 8,713,912 B2
(45) Date of Patent: May 6, 2014

(54) SOLID PROPELLANT ROCKET MOTORS EMPLOYING TUNGSTEN ALLOY BURST DISCS AND METHODS FOR THE MANUFACTURE THEREOF

(75) Inventors: James H. Dupont, Bowie, AZ (US); Sean J. Whitmarsh, Castaic, CA (US)

(73) Assignee: Raytheon Company, Waltham, MA (US)

(*) Notice: Subject to any disclaimer, the term of this patent is extended or adjusted under 35 U.S.C. 154(b) by 967 days.

(21) Appl. No.: 12/834,289

(22) Filed: Jul. 12, 2010

(65) Prior Publication Data

US 2012/0006001 A1 Jan. 12, 2012

(51) Int. Cl.
*F02G 1/00* (2006.01)
*F02K 9/00* (2006.01)
*F16K 17/14* (2006.01)

(52) U.S. Cl.
USPC ............ 60/253; 60/200.1; 60/256; 137/68.13

(58) Field of Classification Search
USPC ........ 60/253, 254, 256, 200.1; 137/67, 67.11, 137/68.13, 68.2, 68.19, 68.21, 68.22, 68.23, 137/68.24, 68.25, 68.26, 68.27, 68.28
See application file for complete search history.

(56) References Cited

U.S. PATENT DOCUMENTS

| | | | | |
|---|---|---|---|---|
| 2,989,844 A * | 6/1961 | Alden et al. | ..................... 60/256 |
| 3,010,355 A * | 11/1961 | Cutforth | ........................... 86/1.1 |
| 3,020,710 A * | 2/1962 | Herzog | ............................ 60/770 |
| 3,044,254 A * | 7/1962 | Adelman | ......................... 60/253 |
| 3,048,968 A * | 8/1962 | Hutchinson | ..................... 60/255 |
| 3,069,843 A * | 12/1962 | Whitsel, Jr. | ...................... 60/220 |
| 3,077,734 A * | 2/1963 | Adelman | ......................... 60/255 |
| 3,144,829 A * | 8/1964 | Fox | .................................... 60/253 |
| 3,210,932 A * | 10/1965 | Walker et al. | ................... 60/256 |
| 3,389,659 A * | 6/1968 | Cassidy et al. | ................ 102/202 |
| 3,446,022 A * | 5/1969 | Puckett et al. | .................. 60/256 |
| 3,461,672 A * | 8/1969 | Eliis et al. | ......................... 60/256 |
| 3,564,845 A * | 2/1971 | Friedman, Jr. et al. | ....... 60/39.47 |
| 4,602,480 A * | 7/1986 | Hill et al. | ......................... 60/253 |
| 4,629,861 A * | 12/1986 | Hibler, Sr. | .................. 219/137 R |
| 5,131,680 A * | 7/1992 | Coultas et al. | ................ 280/737 |
| 5,934,307 A * | 8/1999 | Lehto et al. | ................ 137/68.18 |
| 7,685,940 B1 * | 3/2010 | Cavalleri et al. | .............. 102/376 |

* cited by examiner

*Primary Examiner* — Gerald L Sung
(74) *Attorney, Agent, or Firm* — Renner, Otto, Boisselle & Sklar, LLP

(57) ABSTRACT

Embodiments of a solid propellant rocket motor are provided. In one embodiment, the solid propellant rocket motor includes a pressure vessel having a cavity therein, a solid propellant disposed within the cavity, a nozzle fluidly coupled to the cavity, and a tungsten alloy burst disc positioned proximate the nozzle. The tungsten alloy burst disc is configured to block gas flow through the nozzle when the tungsten alloy burst disc is intact and to fragment at a predetermined burst pressure. Embodiments of a method are further provided for manufacturing a burst disc. In one embodiment, the method comprises the step of forming a burst disc from a tungsten alloy. Embodiments of a burst disc are still further provided. In one embodiment, the burst disc includes an outer annular portion, and a central portion comprising a tungsten alloy.

20 Claims, 2 Drawing Sheets

SOLID PROPELLANT ROCKET MOTORS EMPLOYING TUNGSTEN ALLOY BURST DISCS AND METHODS FOR THE MANUFACTURE THEREOF

TECHNICAL FIELD

The following disclosure relates generally to solid rocket propellant motors and, more particularly, to solid propellant rocket motors employing tungsten alloy burst discs, as well as to tungsten alloy burst discs and methods for the manufacture thereof.

BACKGROUND

A common solid propellant rocket motor typically includes a nozzle (e.g., a convergent or a convergent-divergent nozzle), a tubular pressure vessel, a solid propellant (commonly referred to as "grain"), and an ignition charge. The tubular pressure vessel defines an elongated cylindrical cavity, which is fluidly coupled to the nozzle and in which the grain is stored. When ignited by the ignition charge, the grain burns in a controlled manner to produce exhaust gases, which flow through the nozzle to produce thrust. To ensure that the pressure within the cavity of the pressure vessel accumulates to a level at which ignition of the solid propellant is optimized, a burst disc (also commonly referred to as a "rupture disc," a "rupture panel," or a "rupture diaphragm") is typically positioned downstream of the nozzle outlet; e.g., within the outlet plane of the nozzle. When properly installed and intact, the burst disc blocks gas flow through the nozzle to allow the accumulation of pressure within the pressure vessel. However, when the pressure within the rocket pressure vessel approaches or surpasses a predetermined pressure threshold (referred to herein as the "burst pressure"), the burst disc ruptures or fractures and dislodges from the nozzle to allow the flow of exhaust gases therethrough.

One common type of burst disc, often referred to as a "manhole-type burst disc," assumes the form of a metal (e.g., steel) disc having a central portion that is configured to break away as single piece when pressure applied to be burst disc surpasses the burst pressure. A second common type of burst disc is commonly referred to as a "petal-type burst disc" and assumes the form of a circular material disc having two or more intersecting scribe lines, which extend across different diameters of the disc to define four or more wedge-shaped petals. If the petal-type burst disc is formed from a relatively brittle material, the burst disc petals will tend to break apart along the scribe lines, and thus be expelled from the rocket motor, when the burst disc is exposed to the predetermined burst pressure. If the petal-type burst disc is instead formed from less brittle, more ductile material (e.g., steel), the burst disc will tend to rupture or tear along the scribe lines and the petals will remain attached to the outer annular portion of the burst disc. As a result, when the petal-type burst disc is formed from less brittle, more ductile material, the petals will tend to bend outward in the direction of the exhaust gas flow to permit gas flow through the nozzle.

Conventional burst discs of the type described above are typically limited in at least one of two manners. First, many conventional burst discs (e.g., manhole-type burst discs and relatively brittle petal-type burst discs of the type described above) tend to break apart into one or more relatively large pieces upon fragmentation, which are then expelled from the rocket nozzle within the supersonic gas stream. Larger burst debris are thus ejected from the rocket nozzle at significant velocities and, thus, have kinetic energies sufficiently high to potentially damage nearby objects. Second, conventional burst discs often exhibit burst pressures that vary significantly from the predetermined, target burst disc pressure. For example, in the case of petal-type burst discs formed from less brittle, more ductile materials, the variability in burst disc pressure may arise, in part, from an initial outward bulging of the burst disc prior to rupture. In the context of solid propellant rocket motors, this variability in burst disc pressure may result in a timing delay on the order of a few fractions of a second. While such a timing delay may be acceptable in many applications, in applications characterized by extremely rapid changes in rocket position or attitude, a timing delay of a few fractions of a second can result in significant navigational errors. For example, in the case of munition having an angle of attack rotating at 5,000 degrees per second, an ignition timing delay of one millisecond within a single solid propellant rocket motor could result in a targeting error of 5 degrees.

Considering the above, it would be desirable to provide a solid propellant rocket motor including a burst disc that minimizes burst pressure variability and that minimizes the ejection of larger debris by promoting uniform and complete fragmentation. It would also be desirable to provide embodiments of a burst disc providing the aforementioned objectives that could be utilized in place of a conventional burst disc in a variety of other applications, including within gas generators of the type commonly included within vehicular airbag inflation systems. Lastly, it would be desirable to provide embodiments of a method for manufacturing such a burst disc. Other desirable features and characteristics of the present invention will become apparent from the subsequent Detailed Description and the appended Claims, taken in conjunction with the accompanying Drawings and this Background.

BRIEF SUMMARY

In one embodiment, the solid propellant rocket motor includes a pressure vessel having a cavity therein, a solid propellant disposed within the cavity, a nozzle fluidly coupled to the cavity, and a tungsten alloy burst disc positioned proximate the nozzle. The tungsten alloy burst disc is configured to block gas flow through the nozzle when the tungsten alloy burst disc is intact and to fragment at a predetermined burst pressure.

Embodiments of a method are also provided for manufacturing a burst disc. In one embodiment, the method comprises the step of forming a burst disc from a tungsten alloy.

Embodiments of a burst disc are further provided. In one embodiment, the burst disc includes an outer annular portion, and a central portion comprising a tungsten alloy.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
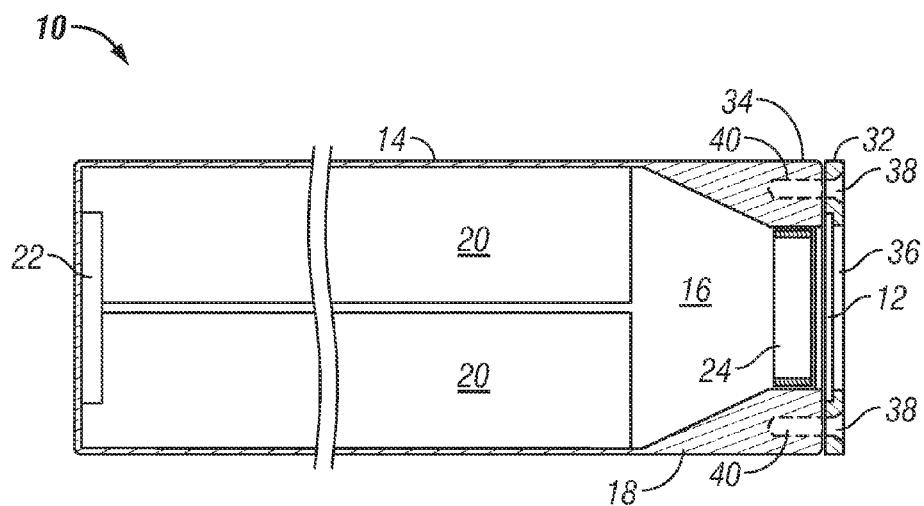
FIGS. 1 and 2 are generalized cross-sectional views of a solid propellant rocket motor including a tungsten alloy burst disc prior to motor ignition and immediately after motor ignition and fragmentation of the burst disc, respectively, in accordance with an exemplary embodiment.
Figure 2:
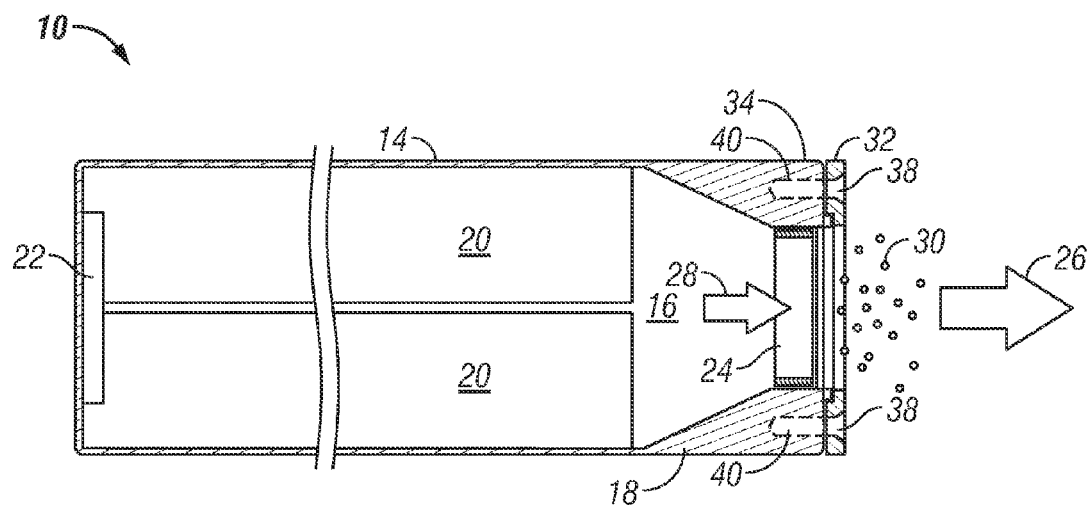

FIGS. 1 and 2 are generalized cross-sectional views of a solid propellant rocket motor 10 including a tungsten alloy burst disc 12 prior to motor ignition and immediately after motor ignition and fragmentation of burst disc 12, respectively, in accordance with an exemplary embodiment. As appearing herein, the phrase "burst disc" is utilized to denote a frangible body designed to fracture, disintegrate, or otherwise break apart when exposed to a predetermined burst pressure. Although the burst disc will typically assume the form of a relatively thin plate having a generally circular planform shape, the burst disc is by no means precluded from assuming other geometries; e.g., in certain embodiments, the burst disc may assume the form of a relatively thin plate having a polygonal planform shape. The phrase "tungsten alloy burst disc" is utilized herein to denote a burst disc, as previously defined, formed from an alloy containing tungsten as its primary constituent, as determined by atomic weight. Similarly, the phrase "tungsten alloy" is utilized to denote an alloy containing tungsten as its primary constituent. By way of illustration, burst disc 12 is shown in FIGS. 1 and 2 and primarily described below as included within a particular type of device, namely, a solid propellant rocket motor. This notwithstanding, it is emphasized that embodiments of tungsten alloy burst disc 12 can be utilized within a wide variety of different applications and platforms wherein it is desired to minimize variability in burst pressure and/or to reduce or eliminate the production of larger burst disc debris upon fragmentation of a burst disc. Embodiments of tungsten alloy burst disc 12 may be particularly useful for deployment within gas generator devices, especially of the type included within vehicular airbag inflation systems.

As previously stated, in the exemplary embodiment illustrated in FIGS. 1 and 2, tungsten alloy burst disc 12 is deployed within a generalized solid propellant rocket motor 10. Solid propellant rocket motor 10 includes a generally tubular pressure vessel 14 having a cylindrical cavity 16 and an convergent nozzle 18, which is fluidly coupled to the aft end of cavity 16. A solid propellant 20 (commonly referred to as "grain") is disposed within cylindrical cavity 16 (e.g., bonded to the inner surface of pressure vessel 14), and an igniter 22 is embedded within solid propellant 20 proximate the forward end of pressure vessel 14. As further shown in FIGS. 1 and 2, an annular nozzle insert 24 is disposed within the throat of convergent nozzle 18 to minimize erosion of the inner walls of nozzle 18 and thereby maintain a substantially constant throat diameter during high temperature gas flow through nozzle 18. Annular nozzle insert 24 may be secured within nozzle 18 by bonding and/or by one or more retentions features, which are not shown in FIGS. 1 and 2 for clarity.

Tungsten alloy burst disc 12 is positioned proximate convergent nozzle 18 and, preferably, immediately downstream of nozzle 18 within the nozzle exit plane. When positioned in this manner and intact (FIG. 1), tungsten alloy burst disc 12 blocks or prevents exhaust gas flow from escaping pressure vessel 16 through convergent nozzle 18. However, when the pressure within pressure vessel cavity 16 surpasses a predetermined burst pressure, tungsten alloy burst disc 12 fragments in a substantially complete and uniform manner to enable exhaust gas flow through convergent nozzle 18. This may be more fully appreciated by comparing FIG. 1, which illustrates solid propellant rocket motor 10 prior to ignition of solid propellant 20, to FIG. 2, which illustrates rocket motor 10 immediately after ignition of propellant 20 and the subsequent fragmentation of burst disc 12. During the ignition sequence, igniter 22 is actuated to ignite solid propellant 20. When ignited, solid propellant 20 burns at a controlled rate to produce exhaust gases, which flow through convergent nozzle 18 after fragmentation of burst disc 12 to produce a forward thrust (indicated in FIG. 2 by arrow 26).

As noted above, tungsten alloy burst disc 12 prevents gas from escaping cavity 16 when burst disc 12 is intact and properly installed within convergent nozzle 18. In so doing, tungsten alloy burst disc 12 allows the chamber pressure within pressure vessel cavity 16 to accumulate to a level at which ignition of solid propellant 20 is optimized and complete ignition of propellant 20 is generally ensured. As generically illustrated in FIG. 2 at 30, burst disc 12 fragments into numerous tiny particles (i.e., disintegrates) when the pressure exerted on tungsten alloy burst disc 12 exceeds the predetermined burst pressure. Upon disintegration, tungsten alloy burst disc 12 is effectively removed from the exhaust flow path, and exhaust gas is permitted to flow through convergent nozzle 18 (indicated in FIG. 2 by arrow 28). Notably, and for reasons that will be explained more fully below, tungsten alloy burst disc 12 fragments in a substantially complete and uniform manner to minimize or eliminate the emission of larger burst disc debris and to reduce any impact of burst disc fragmentation on the flow characteristics of the gas plume exhausted from nozzle 18.

Tungsten alloy burst disc 12 can be secured within rocket motor 10 in a variety of different manners. For example, in certain embodiments, tungsten alloy burst disc 12 may be circumferentially welded over the outlet of nozzle 18 of pressure vessel 14. In further embodiments, an outer annular portion of tungsten alloy burst disc 12 may be machined to include a plurality of openings through which a number of fasteners (e.g., bolts) may be disposed to secure burst disc 12 to the outlet end of nozzle 18. In the illustrated example, specifically, a hold-down member or cover piece 32 is utilized to retain tungsten alloy burst disc 12 against a burst disc retention structure 34 (e.g., an annular rim) coupled to or integrally formed with the outlet end of nozzle 18. Cover piece 32 has a generally annular or washer-like shape and includes a central aperture 36 (labeled in FIG. 1) and a plurality of fastener openings 38 therethrough. Fasteners openings 38 are circumferentially spaced around an outer annular portion of cover piece 32 and receive a plurality of fasteners 40 (e.g., bolts) therethrough (illustrated in phantom in FIGS. 1 and 2). When solid propellant rocket motor 10 is fully assembled, an outer annular portion of tungsten alloy burst disc 12 is captured between cover piece 32 and burst disc retention structure 34, while the central portion of burst disc 12 is exposed through central aperture 36. When the pressure exerted against burst disc 12 surpasses the predetermined burst pressure, the central portion of tungsten alloy burst disc 12 fragments to allow gas flow through nozzle 18, as previously described. The outer annular portion of burst disc 12 may also fragment or, instead, may remain captured between cover piece 32 and burst disc retention structure 34. To help promote uniform fragmentation of burst disc 12, fasteners 40 are preferably spaced around the outer annular portion of burst disc 12 at substantially even intervals and may each be tightened to a predetermined torque during installation.

The present inventors have discovered that burst discs having exceptional metallurgical characteristics (e.g., brittleness) can be fabricated from tungsten alloys. The tungsten alloy utilized in burst disc fabrication is preferably a powdered tungsten alloy and, more preferably, a sintered powdered tungsten alloy. The tungsten alloy conveniently contains a minimum of approximately 90% tungsten, by atomic weight; and, more preferably, a minimum of approximately 95% tungsten, by atomic weight. A non-exhaustive list of additional constituent metals that may be contained within the tungsten alloy includes nickel and iron. The tungsten alloy conveniently has a minimum density of approximately 16 grams per cubic centimeter and preferably has a minimum density of approximately 18 grams per cubic centimeter. The foregoing notwithstanding, the particular composition of the tungsten alloy from which the burst disc is formed will inevitably vary amongst different embodiments in relation to intended application, desired burst pressure, and other such design parameters.

Due, at least in part, to its exceptional brittleness, burst disc 12 will tend to disintegrate (i.e., fragment in a substantially complete and uniform manner) upon exposure to the predetermined burst pressure. Furthermore, in contrast to conventional burst discs that tend to yield relatively large debris upon fracture, burst disc 12 will tend to fracture into a large number of relatively fine particles. Due to their reduced masses, the particles emitted from burst disc 12 will have reduced kinetic energies, and, therefore, be less likely to damage surrounding objects, even when entrained in supersonic gas flows emitted from convergent nozzle 18. In addition, any drag exerted on the gas flow by the burst disc particles will typically be relatively minor in duration and magnitude; thus, in contrast to petal-type burst discs formed from relatively ductile materials (e.g., steel) that can flutter when subjected to supersonic gas and cause undesired bending of the exhaust gas plume, fracture of tungsten alloy burst disc 12 will have minimal impact on the flow characteristics of the gas plume exhausted from convergent nozzle 18. As a still further advantage, tungsten alloy burst disc 12 minimizes variation in burst pressure. In particular, relative to conventional burst discs of the type described above, such as petal-type burst discs formed from more malleable or ductile materials, tungsten alloy burst disc 12 will reliably fracture when exposed to a pressure substantially equivalent to a target burst pressure. As a result, tungsten alloy burst disc 12 allows ignition timing sequences to be more accurately back-calculated; and, when utilized within solid propellant rocket motor 10, burst disc 12 can greatly reduce guidance errors that may otherwise occur due to unpredictable timing delays created by variance in the burst pressure of conventional burst discs.

Example of a Specific Tungsten Alloy Suitable for Use in the Formation of a Burst Disc By way of illustration and not of limitation, the following table provides an exemplary composition of a tungsten alloy from which a burst disc (e.g., tungsten alloy burst disc 12 shown in FIGS. 1 and 2) can be formed.

| Component | At. % |
| --- | --- |
| Nominal Tungsten Content | 97.0 |
| Nominal Nickel Content | 2.1 |
| Nominal Iron Content | 0.9 |

Figure 3:
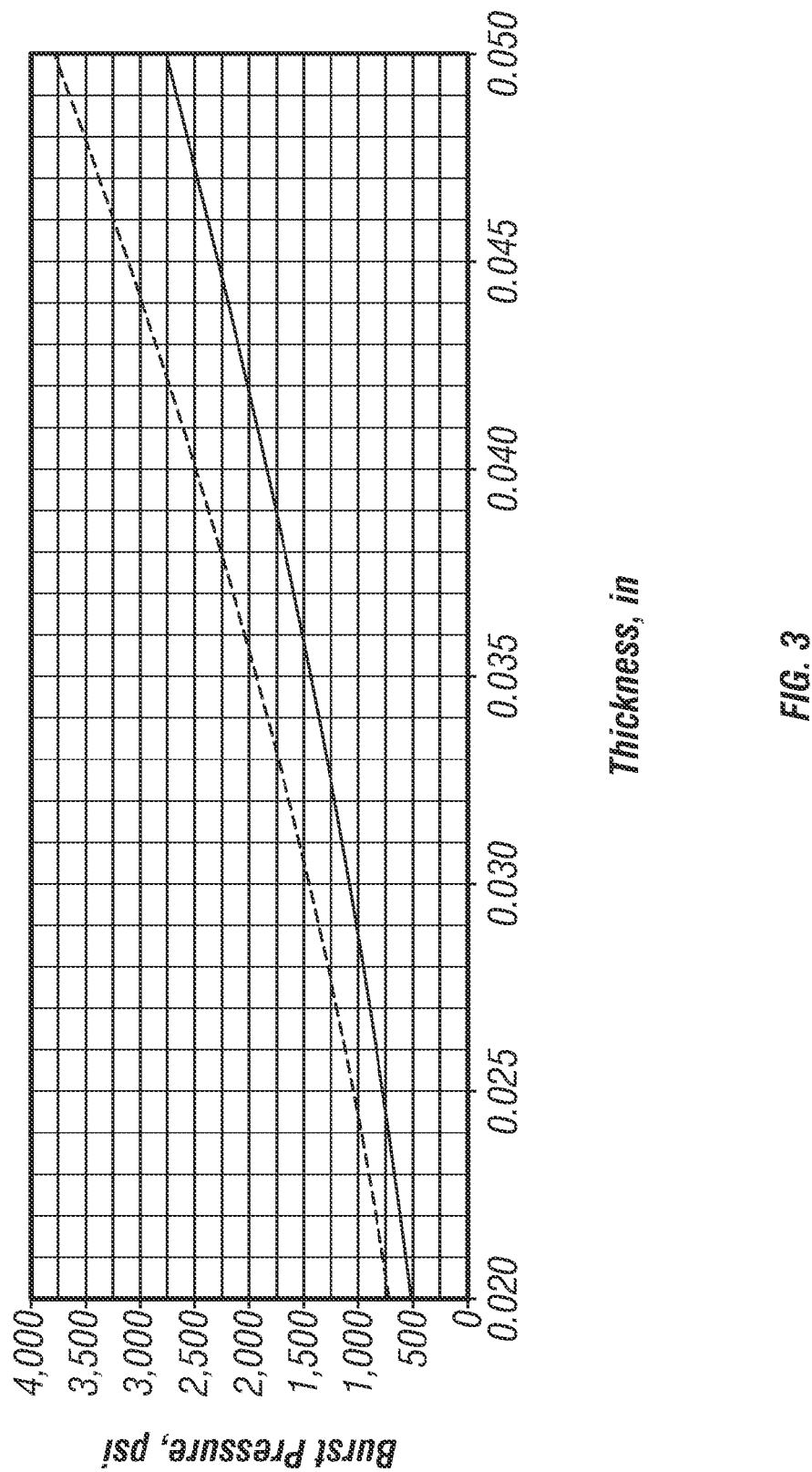
FIG. 3 is a graph of burst disc thickness (horizontal axis) versus burst pressure (vertical axis) for an exemplary burst disc formed from a tungsten alloy having a specific composition.

FIG. 3 is a graph of burst disc thickness (horizontal axis, inches) versus burst pressure (vertical axis, pounds-per-square-inch) for an exemplary burst disc formed from a tungsten alloy having the composition set-forth in the table above. In this particular model, a tungsten alloy burst disc having a generally circular geometry and a diameter of approximately 1.000 inch was considered. The upper and lower curves shown in FIG. 3 are representative of upper and lower thresholds, respectively, selected to account for structural defects in the tungsten alloy microstructure and/or variations in burst disc fabrication processes. As can be seen in FIG. 3, burst pressure increases in a substantially linear relationship with increasing axial thickness of the modeled burst disc. The graph shown in FIG. 3 can conveniently be utilized to determine an axial thickness to which the burst disc should be formed to achieve a desired burst pressure utilizing the exemplary tungsten alloy. Alternatively, a two dimensional look-up table can be utilized to determine the burst disc thickness required to achieve a desired burst pressure when the burst disc is formed from a chosen tungsten alloy. Although burst disc thickness will inevitably vary amongst different embodiments, the axial thickness of the burst disc is preferably between approximately 0.010 inch and approximately 0.250 inch. As a more specific example, and as indicated in FIG. 3, burst disc thickness may be between approximately 0.020 inch and approximately 0.050 inch when the burst disc is deployed within a smaller-sized rocket motor, such as rotor motor 10 shown in FIGS. 1 and 2.

Embodiments of the tungsten alloy burst disc can be manufactured utilizing a number of different techniques. In embodiments wherein the tungsten alloy burst disc comprises a sintered powdered tungsten alloy, a solid state sintering process may be utilized wherein a mixture of powdered tungsten and other powered metals is exposed to elevated temperatures and pressures for predetermined time periods to induce self-welding of the powered metals and thereby yield one or more solid structures having certain desired metallurgical properties. The tungsten alloy may be produced in sheet form, which may then be subjected to one or more machining steps to yield the tungsten alloy burst disc. For example, burst disc blanks may first be cut from the tungsten alloy sheet. If the selected tungsten alloy sheet was not prefabricated to the desired burst disc thickness (again, which may be determined based upon a burst pressure-versus-thickness profile for the selected tungsten alloy, such as the profile shown in FIG. 3), the burst disc blank may be subjected to one or more grinding, lapping, or similar steps to fine tune the axial thickness of the final burst disc. One or more surfaces of the burst disc may also be polished to remove any surface aberrations present thereon. Additional machining steps may then be performed to complete fabrication of the tungsten alloy burst disc; e.g., if desired, a plurality of circumferentially-spaced fastener openings may be formed through an outer annular portion of the burst disc.

The foregoing has thus provided an exemplary embodiment of a solid propellant rocket motor including a tungsten alloy burst disc that minimizes burst pressure variability and that reduces or eliminates the emission of larger debris by promoting uniform and complete fragmentation of the burst disc upon exposure to a predetermined burst pressure. More generally, there has been provided embodiments of tungsten alloy burst disc that can be utilized in a wide variety of applications, including within gas generators of the type commonly included within vehicular airbag inflation systems. In particular, embodiments of a tungsten alloy burst disc have been provided wherein the burst disc includes an outer annular portion and a central portion, which preferably comprises tungsten and, more preferably, is integrally formed with the outer annular portion from a sintered powdered tungsten alloy. Finally, there has been provided embodiments of a method for fabricating tungsten alloy burst disc of the type described above.

Although an exemplary tungsten alloy burst disc was described above as positioned in the exit plane of a convergent nozzle, it will be appreciated that embodiments of the tungsten alloy burst disc can be utilized in conjunction with other types of nozzles and nozzle assemblies (e.g., convergent-divergent nozzle assemblies deployed aboard larger rocket motors) and may be positioned at other locations within the rocket motor (e.g., within the throat of a larger rocket motor). It is, however, preferred that embodiments of the tungsten alloy burst disc are positioned immediately downstream of the nozzle, and specifically positioned within the nozzle outlet plane, to remove the burst disc from the exhaust plume and to minimize flow irregularities.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A solid propellant rocket motor, comprising:
   a pressure vessel having a cavity therein;
   a solid propellant disposed within the cavity;
   a nozzle fluidly coupled to the cavity; and
   a tungsten alloy burst disc positioned proximate the nozzle, the tungsten alloy burst disc configured to block gas flow through the nozzle when the tungsten alloy burst disc is intact and to fragment at a predetermined burst pressure,
   wherein the tungsten alloy burst disc comprises a powdered tungsten alloy.

2. A solid propellant rocket motor according to claim 1 wherein the tungsten alloy burst disc comprises a sintered powdered tungsten alloy.

3. A solid propellant rocket motor according to claim 1 wherein the nozzle comprises a retention structure, and wherein the solid propellant rocket motor further comprises a cover piece coupled to the retention structure and retaining the tungsten alloy against the retention structure.

4. A solid propellant rocket motor according to claim 1 wherein the tungsten alloy burst disc has an axial thickness between 0.010 inch and 0.250 inch.

5. A solid propellant rocket motor according to claim 1 wherein the tungsten alloy comprises at least 90% tungsten, by weight.

6. A solid propellant rocket motor according to claim 5 wherein the tungsten alloy comprises at least 95% tungsten, by weight.

7. A solid propellant rocket motor according to claim 1 wherein the tungsten alloy burst disc has a minimum density of 16 grams per cubic centimeter.

8. A solid propellant rocket motor according to claim 7 wherein the tungsten alloy has a minimum density of 18 grams per cubic centimeter.

9. A solid propellant rocket motor according to claim 1 wherein the burst disc includes an outer annular portion coupled to the nozzle and a central portion configured to fragment at a predetermined burst pressure.

10. A solid propellant rocket motor according to claim 9 wherein the outer annular portion is also configured to fragment at a predetermined burst pressure.

11. A solid propellant rocket motor according to claim 9 wherein the outer annular portion and the central portion are integrally formed from a powdered tungsten alloy.

12. A solid propellant rocket motor according to claim 1 wherein the nozzle includes an outlet, and wherein the burst disc is coupled over the outlet.

13. A solid propellant rocket motor according to claim 1 wherein the tungsten alloy burst disc has an axial thickness between 0.020 inch and 0.050 inch.

14. A solid propellant rocket motor according to claim 1 wherein the nozzle extends axially away from the pressure vessel, and wherein an inner diameter of the nozzle decreases in a direction extending axially away from the pressure vessel.

15. A solid propellant rocket motor, comprising:
    a pressure vessel having a cavity therein;
    a solid propellant disposed within the cavity;
    a nozzle in fluid communication with the cavity; and
    a tungsten alloy burst disc positioned proximate the nozzle, the tungsten alloy burst disc configured to block gas flow through the nozzle when the tungsten alloy burst disc is intact and to fragment at a predetermined burst pressure,
    wherein the tungsten alloy comprises at least 90% tungsten, by weight.

16. A solid propellant rocket motor according to claim 15 wherein the tungsten alloy comprises at least 95% tungsten, by weight.

17. A solid propellant rocket motor according to claim 15 wherein the tungsten alloy burst disc has an axial thickness between 0.010 inch and 0.250 inch.

18. A solid propellant rocket motor according to claim 15 wherein the tungsten alloy burst disc has a minimum density of 16 grams per cubic centimeter.

19. A solid propellant rocket motor according to claim 15 wherein the tungsten alloy burst disc comprises a powdered tungsten alloy.

20. A solid propellant rocket motor according to claim 15 wherein the tungsten alloy burst disc comprises a sintered powdered tungsten alloy.

* * * * *